Sept. 2, 1952 H. A. BERLINER 2,608,820
VARIABLE AREA TAIL PIPE FOR JET ENGINES
Filed Aug. 30, 1948 2 SHEETS—SHEET 2
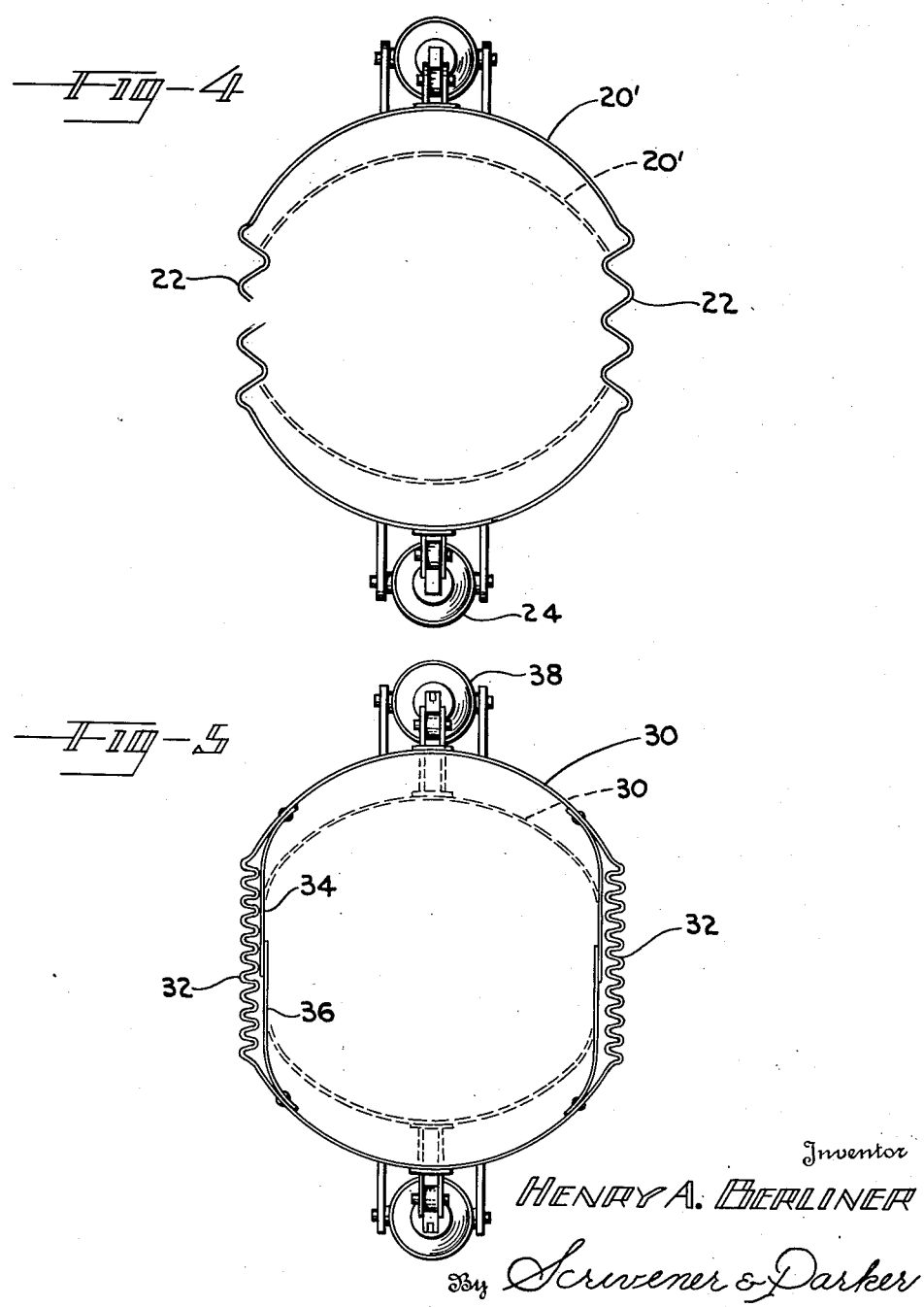

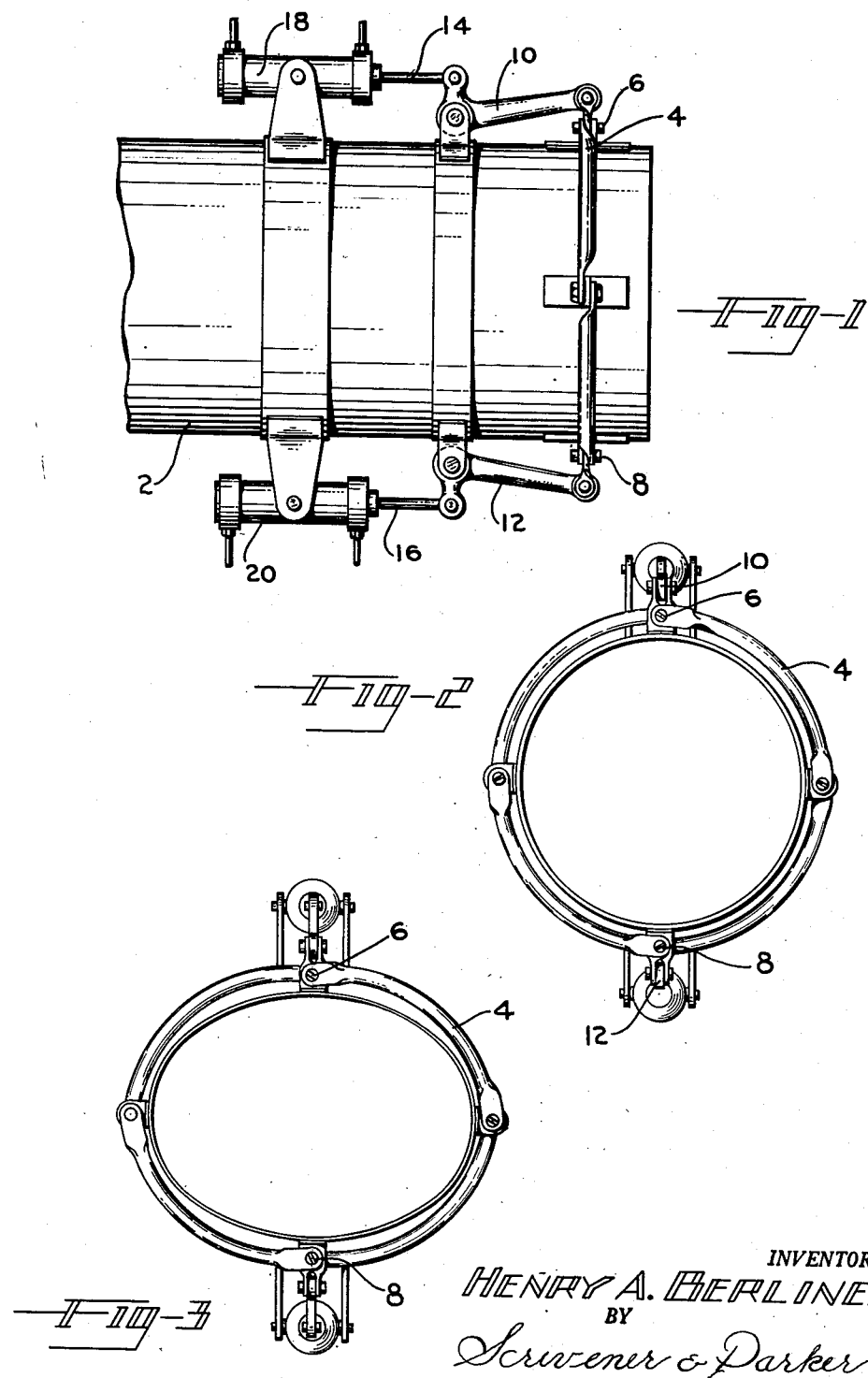

Patented Sept. 2, 1952

2,608,820

UNITED STATES PATENT OFFICE 2,608,820

VARIABLE AREA TAIL PIPE FOR JET ENGINES

Henry A. Berliner, Washington, D. C., assignor to Engineering & Research Corporation, Riverdale, Md., a corporation of Maryland Application August 30, 1948, Serial No. 46,729

1 Claim. (Cl. 60—35.6)

This invention relates broadly to the propulsion of aircraft by means of the reaction of rearwardly-discharged gases, such as is accomplished by jet engines and rockets and, more particularly, has to do with the nozzle or tail-pipe through and from which the gases are discharged. Although not limited to use with turbo-jet engines the invention will be described in this application in connection with such an engine.

In jet engine design and operation it has been established that the jet orifice should vary in size with various operating conditions in order to achieve maximum efficiency and performance under such varied conditions. For example, in one type of jet engine to which this invention may be usefully applied air is taken into the inlet end of the engine duct, compressed, passed into combustion chambers from which it flows to a turbine which drives the compressor and, from there, passes through the tail-pipe to be discharged rearwardly of the aircraft to produce the forward propulsive effort. In some engines now being used additional propulsive effort for takeoff, climbing and high-speed maneuvering is secured by burning additional fuel on the delivery side of the turbine in order to raise the temperature of the advancing gas. It has been found that when such a so-called "after-burner" is used, efficiency considerations require that the area of the passage through the tail-pipe be greater than its area under normal cruising conditions when the after-burner is not in use. It has therefore become desirable that means be provided for varying the area of the tail-pipe passage and a number of constructions and arrangements have been proposed for accomplishing this end.

In addition to efficiency considerations, a variable area tail-pipe also provides means for accomplishing another result of great benefit to jet engine operation. This result is due to the fact that at high altitudes a considerable temperature drop occurs which may be as great as 150° below sea level temperature. This causes the entire cycle of the jet engine to operate at a lower temperature than that at which the engine is designed to operate at maximum efficiency. By means of my invention the area of the tail-pipe nozzle may be progressively reduced as the ambient temperature decreases, thus creating a progressively increasing back pressure in the engine which tends to increase the temperature of operation of the engine and consequently maintain it at the temperature at which it operates with maximum efficiency.

These new and advantageous results are accomplished by my present invention by the provision of means for deforming the tail-pipe from a circular to a more or less flattened cross-section, thus reducing the cross-sectional area of the pipe, which is made of such material, or is so constructed, that when the deforming pressure is relieved the pipe may be returned to its normal circular section.

A number of embodiments of my invention are described in the following specification and illustrated in the annexed drawings, it being understood that these embodiments are only illustrative of the invention and impose no limits thereon not imposed by the appended claim.

In the drawings forming part of this application,

Fig. 1 is a side elevational view of the tail-pipe of a jet propelled aircraft, showing a deforming means according to this invention;

Fig. 2 is an end view of the tail-pipe of Fig. 1 in normal, undeformed condition;

Fig. 3 is similar to Fig. 2 but shows the tail-pipe deformed to reduce its area;

Fig. 4 is an end view of a tail-pipe showing a modified form of the invention, and Fig. 5 is an end view of a tail-pipe showing another embodiment of the invention.

In accordance with my invention I provide a jet engine tail-pipe which is normally circular in cross-section and which is wholly or partially formed of material which may be bent or flexed to deform the pipe by flattening it. An embodiment of my invention is disclosed in Figs. 1, 2 and 3 of the drawings, which illustrate the rear empennage of a jet propelled aircraft, the jet engine not being shown but the tail-pipe of the engine being shown at 2. The tail-pipe is substantially circular in cross-section and is formed of a material such as sheet steel of thin gauge which may be deformed from its normal circular sectional shape to flattened shape and, when the deforming force is removed, may be returned to the original shape of the pipe.

In the disclosed embodiment of the invention the means provided by the invention for deforming the tail-pipe comprise an articulated ring 4 consisting of a plurality of arcuate segments (four being shown) pivotally connected at their ends and surrounding and attached to the tail-pipe adjacent the rear end thereof. Two diametrically-opposite pivoted parts 6, 8 of the ring are connected to the rear ends of two bell-crank levers 10, 12 which are mounted at their fulcrums on the exterior of the tail-pipe. The forward ends of these bell-cranks are connected to the rods 14, 16 of two pistons which operate in hydraulic or air cylinders 18, 20.

It will be apparent that when the area of the tail-pipe is to be reduced the fluid pressure system, including the cylinders 18, 20 may be operated to move the bell-cranks in such a way that the opposite pivoted parts 6, 8 of the ring 4 are forced toward each other, thus deforming the tail-pipe from circular to non-circular shape, as shown in Figs. 2 and 3, consequently reducing its area. As the pivoted parts 6, 8 are forced toward each other the intermediate pivotal connections will flex outwardly as shown in Fig. 3. When desired, the pistons may be operated in the opposite direction to restore the tail-pipe to its original cross-section.

In the modified form of the invention disclosed in Fig. 4 the opposite lateral side walls of the tail-pipe 20' are corrugated as shown at 22 in order to facilitate the deformation of the pipe from approximately circular shape, as shown in full lines, to flattened shape as shown in dotted lines. The ring 4 of the embodiment of Figs. 1, 2 and 3 is not required in this form of the invention and the operators 24, which are similar to those of Figs. 1, 2 and 3, will operate directly on the rear end of the tail-pipe. The corrugations 22 may increase the frictional resistance of the pipe to the passage of gases and in order to prevent this means may be provided internally of the pipe and covering the corrugations for the purpose of shielding them from the flow of gases. The shielding means at each side of the pipe comprise upper and lower plates or metal sheets 34, 36 which are respectively attached to the upper and lower walls of the pipe, and overlie the corrugations and overlap along the horizontal center line of the pipe in the normal and deformed conditions thereof. These plates are coextensive with the corrugations longitudinally thereof and therefore shield the corrugations from the gases and present to the gases only the smooth inner surfaces of the plates.

While I have disclosed a number of embodiments of my invention, it will be apparent to those skilled in the art that other embodiments, as well as modifications of those disclosed, may be made without departing in any way from the spirit or scope of the invention, for the limits of which reference must be made to the appended claim.

What is claimed is:

A tail pipe for a jet propulsion unit, said pipe having outwardly arcuate top and bottom walls connected by two substantially parallel side walls, corrugations formed in said side walls which extend longitudinally of the tail-pipe, means for forcing the two arcuate walls toward each other to deform the tail pipe by folding the corrugations, and means disposed inwardly of the tail-pipe for shielding the corrugations from the flow of gases within the pipe comprising upper and lower plates which are respectively attached to the upper and lower arcuate walls of the pipe at each side thereof and which overlie the corrugations and the ends of which overlap along the horizontal center line of the pipe.

HENRY A. BERLINER.

REFERENCES CITED

The following references are of record in the file of this patent:

UNITED STATES PATENTS

| Number | Name | Date |
|---|---|---|
| 2,157,564 | Peuthert | May 9, 1939 |
| 2,444,008 | Fentress | June 22, 1948 |

FOREIGN PATENTS

| Number | Country | Date |
|---|---|---|
| 171,600 | Great Britain | Nov. 24, 1921 |
| 586,571 | Great Britain | Mar. 24, 1947 |
| 588,501 | Great Britain | May 27, 1947 |
| 593,071 | Great Britain | Oct. 7, 1947 |